W. ROHKOHL.
TROLLEY.
APPLICATION FILED FEB. 3, 1914.
1,099,618.
Patented June 9, 1914.
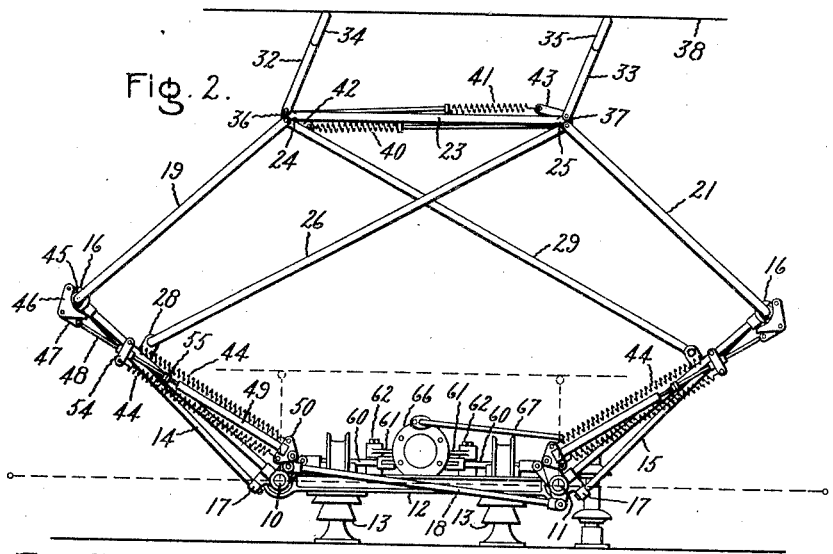
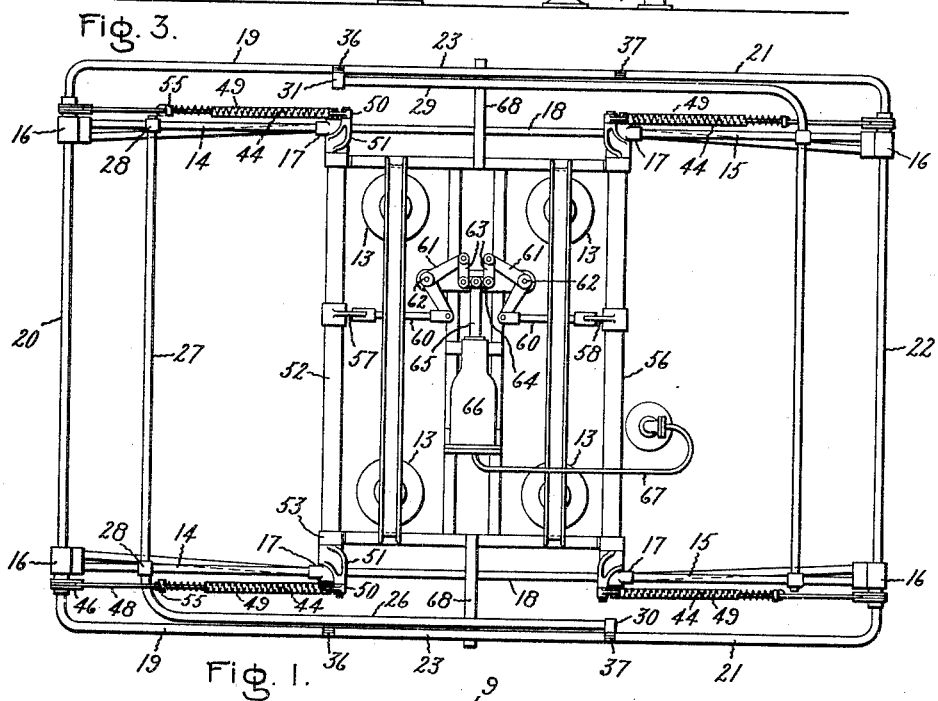
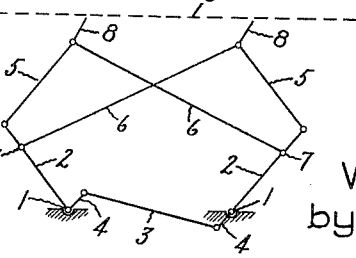
Witnesses:
Earl G. Klock.
J. Ellis Glen
Inventor:
Wilhelm Rohkohl,
by Albert G. Davis
His Attorney.

UNITED STATES PATENT OFFICE.

WILHELM ROHKOHL, OF POTSDAM, GERMANY, ASSIGNOR TO GENERAL ELECTRIC COMPANY, A CORPORATION OF NEW YORK.

TROLLEY.

1,099,618. Specification of Letters Patent. Patented June 9, 1914.

Application filed February 3, 1914. Serial No. 816,179.

*To all whom it may concern:*

Be it known that I, WILHELM ROHKOHL, a subject of the King of Prussia, residing at Potsdam, Germany, have invented certain new and useful Improvements in Trolleys, of which the following is a specification.

My invention relates to trolleys, its aim being to provide for the collection or transmission of current from the trolley wire with various advantages and to meet even the most difficult conditions of service.

Among the advantages obtainable in trolleys constructed in accordance with my invention, I may mention the ability to deal with heavy currents; the most uninterrupted possible collection of current on high speed railways; freedom from derangement; and simplicity, strength, ruggedness, and durability.

In accordance with my invention, I provide a plurality of contact members, preferably arranging them on apparatus of the pantograph type so that at least one always rests on the trolley wire and that the descent or lowering of one collector bow or other rubbing or rolling contact member affects another as little as possible. To obtain these latter results, it is best to arrange the contact members as far apart as possible, and also to aim at combining strength of the whole trolley apparatus or system against vibration with the utmost elasticity and with lightness of the moving parts; and I have hereinafter shown and described forms of trolley in which two contact members are carried by simple and rugged double pantographs or shears whereby these and other advantages are secured. While, however, these structures are the best at present known to me, and while my invention extends to these particular forms of apparatus and to their specific features and details and their various novel combinations and arrangements of parts, yet the invention is not confined thereto, but can be otherwise carried out and embodied.

In the accompanying drawing, Figure 1 is a diagrammatic representation of one form of double pantograph or shears trolley. Fig. 2 is an elevation of a somewhat modified form of trolley structure, and Fig. 3 is a plan showing the same trolley lowered, certain parts being omitted to avoid confusion.

The trolley, as shown in Fig. 1, is movably supported by the stationary axles 1, 1 suitably mounted on the locomotive or other vehicle. The lower shear arm members 2, 2 swing about these axles 1 and are compelled to move in unison by a link 3 connecting the crank arms 4, 4 which are rigidly connected to said arm members. To the upper ends of the lower shear arm members 2 are pivoted the upper shear arm members 5, 5. The upper end of each of these upper arm members 5 is connected by one of two members 6, 6 with an intermediate point 7 of the opposite lower arm member 2, these members 6 crossing each other diagonally and serving to stiffen or strengthen the whole system. The collector bows 8 which slide on the trolley conductor or wire 9 are pivoted at the apices of the two complete pantographs or shears formed by the several parts,—the one, that is, by the left-hand upper shear arm member 5, the cross-rod member 6 pivoted thereto, and the two lower arm members 2, and the other by the right hand upper shear arm member 5, the cross-rod member 6 pivoted thereto, and the two lower arm members 2.

In the case of a trolley comprising two parallel systems or structures mounted on the opposite ends of the main axles, as far apart as possible, it is not really necessary that the systems be independently or coextensively constructed as complete shears or pantographs; indeed, it is enough for one side of the trolley to be of shear construction and the contact members to be supported in some other suitable way on the other side. The advantages of the double shears or pantograph can also be obtained with the shear parts of one side of the trolley connected with the shear parts of the other side by crossing somewhat diagonally extending shear arm members.

It will be seen from Figs. 2 and 3 that in the double trolley therein shown the axles 10 and 11 are mounted in a framework 12 which is in turn supported on the roof of the locomotive or car by insulating means 13. As shown, each of the lower shear arm members 14, 14 and 15, 15 consists of two rods (preferably hollow) secured together and to a common bearing part 16 at their upper ends and secured to a crank part 17 at their lower ends, so that the arm member is a light rigid structure. The crank parts 17 associated with the lower left-hand shear arm members 14 at opposite sides of the trolley are secured to the ends of the shaft 10 so that said arm members 14 must swing together, and the crank parts 17 associated with the lower right-hand arm members 15 are similarly secured to the shaft 11, so that said arm members 15 must also swing together; and at both front and rear of the trolley structure—meaning by "front" the side of the trolley toward the observer in Fig. 2, and by "rear" the side away from him in that figure—the crank parts 17 on the shafts 10 and 11 are connected together by a link member 18, so that all the lower arm members must move in unison. The upper left-hand shear arm members 19 and the axle or pivot 20 by which they are secured to the corresponding lower shear arms 14 are formed by a rod or tube bent to a broad and angular U form and arranged with the axle portion 20 extending through the bearing parts 16, and the upper right-hand shear arm members 21 and the corresponding axle 22 are similarly constructed and arranged. The upper ends of the upper arm members 19 and 21 at the front of the trolley are connected together by a top member 23 having end pieces with flattened ears or lugs 24 and 25 adapted to be pivoted to the ends of the arm members, and the corresponding upper arm members 19 and 21 at the rear of the trolley are connected together in like manner. The diagonal member 26 extending upward from the left at the front of the trolley is preferably pivotally connected to the rear arm member 14 as well as to the front one,—the pivot or axle 27 being shown as consisting of a rearwardly bent portion of the rod or tubing which extends through lugs 28 secured to the arm members 14,—and the diagonal member 29 extending upward from the right at the rear of the trolley is similarly connected to both the arm members 15. The upper ends of the diagonals 26 and 29 are pivoted to the corresponding ends of the corresponding members 23 and of the corresponding upper arm members 19 and 21 by the same pivots by which said members 23 and arms 19 and 21 are secured together, being provided with suitable end pieces or caps 30 and 31 for this purpose. The contact bows 32 and 33 (omitted from Fig. 3) are preferably of a suitably widened U form,—this not appearing,—and are provided with rubbing strips 34 and 35 of aluminum or other suitable metal. The ends of the bows 32 and 33 are pivoted to lugs or ears 36 and 37 at the ends of the members 23, and the bows are independently and yieldingly held up against the trolley wire 38 by helical tension springs 40 and 41 connected respectively between crank arms 42 and 43 associated with the respective bows and the pivots on which the bows are mounted.

It will be seen that though the sides of the trolley structure shown in Figs. 2 and 3 are slightly different from the double pantograph construction shown in Fig. 1, yet with regard to the support and movement of the contact bows 32 and 33 each side is nevertheless substantially an independent double pantograph or shears in which each of the top members 23 in a manner corresponds to one of the diagonal members 26 or 29 which help to form the simple pantographs that include said members 26 and 29, coacting with the arm members 14 and 15 not included in said simple pantographs in the support of the contacts and so in effect forming other simple pantographs. Thus the support afforded the contacts by each side of the system is in a measure independent of the other side, each side being equivalent to the type of double shears or pantograph shown in Fig. 1.

The trolley shown is maintained in elevated position by resiliently yielding means comprising helical tension springs 44 arranged in pairs adjacent the lower shear arms 14 and 15. Referring to the left of Figs. 1 and 2 and to the front of the trolley structure in Fig. 2, it will be seen that there is an outwardly and upwardly extending crank arm 45 secured to the axle 20 just in front of the bearing part 16. To this arm 45 is pivoted an irregular shaped cam link 46 whose curved inner side rests against the hub of said arm 45. To the cam link 46 is pivoted a link 47, and to this link 47 is in turn pivoted a rod 48 which telescopes within a tube 49 whose lower end carries an end piece 50 which is pivoted to a crank arm 51 mounted on one end of a hollow sleeve 52 that surrounds the shaft 10 and contains the bearings for the latter. The crank arm 51 is mounted on the extreme end of the sleeve 52 between its bearing 53 in the framework 12 and the crank part 17 on the end of the shaft 10, its end overhanging said part 17 so that the parts 48 and 49 lie in front of the lower arm member 14. The springs 44 are connected between a cross-head 54 adjustably mounted on the rod 48 and the end piece 50, one at each side of the parts 48 and 49. The sliding of the rod 48 within the tube 49 is limited by an adjustable stop 55 on said rod. The other springs 44 are similarly mounted and arranged, being connected to a sleeve 56 that surrounds the shaft 11. As the trolley collapses in consequence of variation in the height of the trolley wire 38, the cam links 46 act to make the resulting extension of the springs 44 greater than it would otherwise be and to increase the effective lever arms by which the springs 44 act to raise the lower shear arm members 14 and 15 and counteract the collapse, and vice versa. When the trolley is lowered or raised as hereinafter described, similar action of the cam links 46 helps to cushion the movement.

The raising and lowering of the trolley is effected by turning the sleeves 52 and 56 in opposite directions. As shown, there are crank arms 57 and 58 on said sleeves 52 and 56, and each of these crank arms is connected by a link 60 to one arm of a crank 61 pivoted to the framework 12 at 62. The other arms of the cranks 61 are connected by links 63 to a crosshead 64 on the piston rod 65 associated with a cylinder 66 mounted on the frame-work 12, the rear of this cylinder being connected by a pipe 67, etc., to suitable air control means (not shown) within the locomotive or car. As long as a suitable degree of pressure is maintained on the piston in the cylinder 66, the trolley will remain elevated as shown in full lines in Fig. 2; when the pressure is released, the trolley will descend to the position indicated in dotted lines in Fig. 2 and in full lines in Fig. 3. When the trolley is lowered, the parts 18, 23, 26, and 29 will rest on suitable brackets 68 that project from the framework 12; these brackets are shown in Fig. 3, but are omitted from Fig. 2 to avoid confusion.

What I claim as new and desire to secure by Letters Patent of the United States, is:—

1. A multiple contact trolley structure comprising a simple pantograph affording support for one contact and a plurality of additional members pivotally connected to members of said pantograph and to one another and affording support for another contact.

2. A multiple contact trolley structure comprising two simple shears having separate pivotally connected contact supporting members and having common lower arm members.

3. A double shear trolley comprising two simple shears so united as to have common stationary axes and common lower shear arm members.

4. A trolley structure comprising two pivotally mounted lower arm members, two upper arm members each pivoted to one of said lower arm members, a member connecting one of said upper arm members with the lower arm member that is pivoted to the other upper arm member, and an additional member connecting said latter upper arm member to another member.

5. A multiple contact trolley comprising parallel trolley structures each comprising two simple shears each having separate pivotally connected contact supporting members and common lower arm members, a lower arm member of each of said trolley structures being connected with a contact supporting member of the other by a diagonally extending member.

6. A multiple contact trolley comprising two parallel trolley structures each comprising two pivotally mounted lower arm members, two upper arm members each pivoted to one of said lower arm members, a member connecting one of said upper arm members with the lower arm member that is pivoted to the other upper arm member, and an additional member connecting said latter upper arm member to another member, the upper arm members connected to lower arm members as aforesaid in the two parallel trolley structures being at opposite ends thereof.

In witness whereof, I have hereunto set my hand this 17th day of January 1914.

WILHELM ROHKOHL.

Witnesses:
WALTHER REINHARD,
ERICH LEVY.

Copies of this patent may be obtained for five cents each, by addressing the "Commissioner of Patents, Washington, D. C."